G. DE WITT.
TRANSMISSION GEAR SHIFTING DEVICE.
APPLICATION FILED JUNE 5, 1913.
1,123,857.
Patented Jan. 5, 1915.
5 SHEETS—SHEET 3.
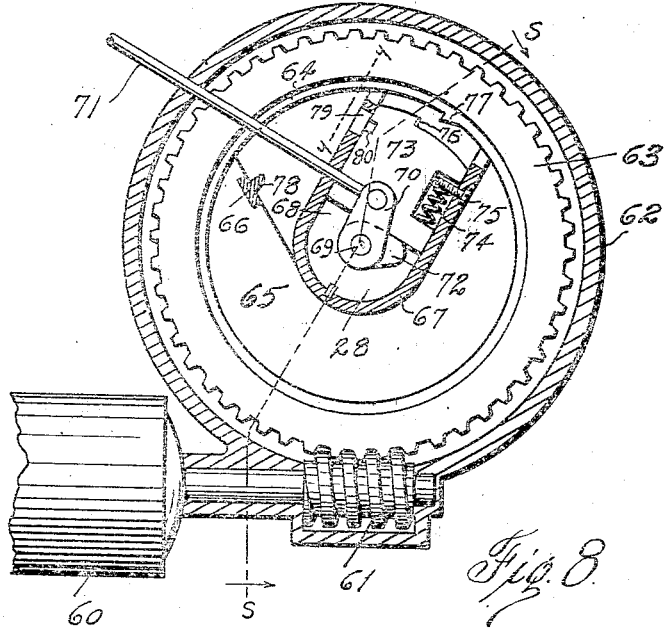
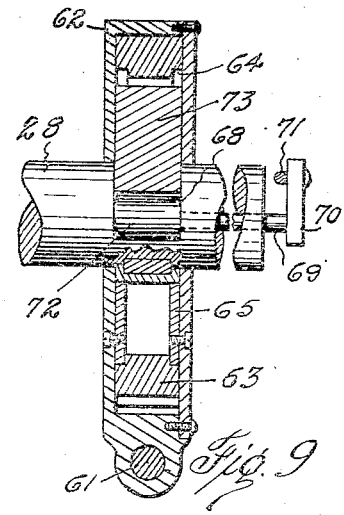
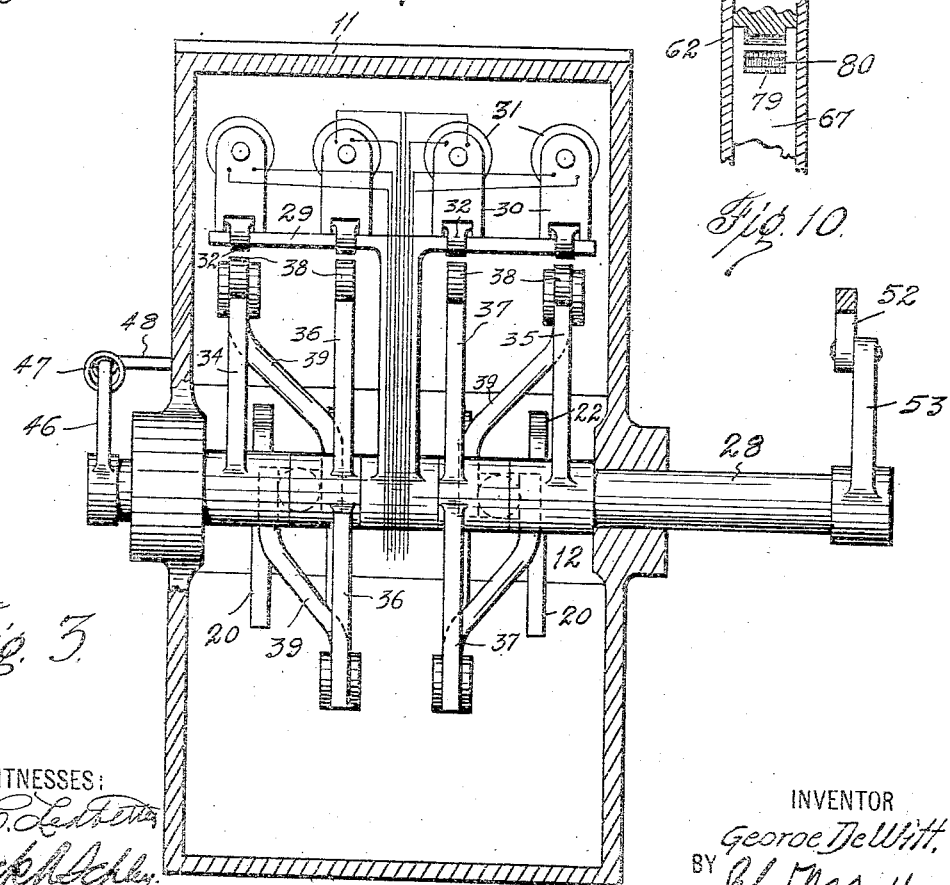
INVENTOR
George DeWitt,
BY
ATTORNEY
WITNESSES:

G. DE WITT.
TRANSMISSION GEAR SHIFTING DEVICE.
APPLICATION FILED JUNE 5, 1913.

1,123,857.

Patented Jan. 5, 1915.
5 SHEETS—SHEET 4.

WITNESSES:

INVENTOR
George DeWitt,
BY
ATTORNEY

G. DE WITT.
TRANSMISSION GEAR SHIFTING DEVICE.
APPLICATION FILED JUNE 5, 1913.

1,123,857.

Patented Jan. 5, 1915.
5 SHEETS—SHEET 5.

WITNESSES:
J. C. Lettitter
Jack S. Ackley

INVENTOR
George DeWitt,
BY John M. Gellman
ATTORNEY

UNITED STATES PATENT OFFICE.

GEORGE DE WITT, OF HOUSTON, TEXAS, ASSIGNOR OF ONE-THIRD TO L. R. MUNGER AND ONE-THIRD TO S. I. MUNGER, JR., OF DALLAS, TEXAS.

TRANSMISSION-GEAR-SHIFTING DEVICE.

REISSUED

1,123,857.     Specification of Letters Patent.     Patented Jan. 5, 1915.

Application filed June 5, 1913. Serial No. 771,822.

*To all whom it may concern:*

Be it known that I, GEORGE DE WITT, a citizen of the United States, residing at Houston, in the county of Harris and State of Texas, have invented certain new and useful Improvements in Transmission-Gear-Shifting Devices, of which the following is a specification.

This invention as specified relates to transmission gear shifting devices.

The object of the invention, primarily, is to provide means for shifting the transmission parts of an automobile or other motor driven vehicle, without employing the usual hand levers and appliances, and to do so by means of electrically controlled operating mechanism in combination with certain component parts, an example of which will be hereinafter described.

Another object of the invention is to locate circuit closing means for the electrically controlled operated mechanism, on the steering wheel or in convenient reach of the operator.

Among other objects are the provision; of means for holding the parts in a selected position; means for positively and automatically returning the parts to neutral or normal position whenever any of said parts are released from a selected position; and means for locking the transmission shifting connections in position; preventing of the operation of more than one at a time, and making it necessary for one of said connections to return to neutral before the other can be operated.

A still further object of the invention is to provide a device of the character described that will be strong, durable, efficient, and simple and comparatively inexpensive to construct, also one in which the several parts will not be likely to get out of working order.

Figure 1:
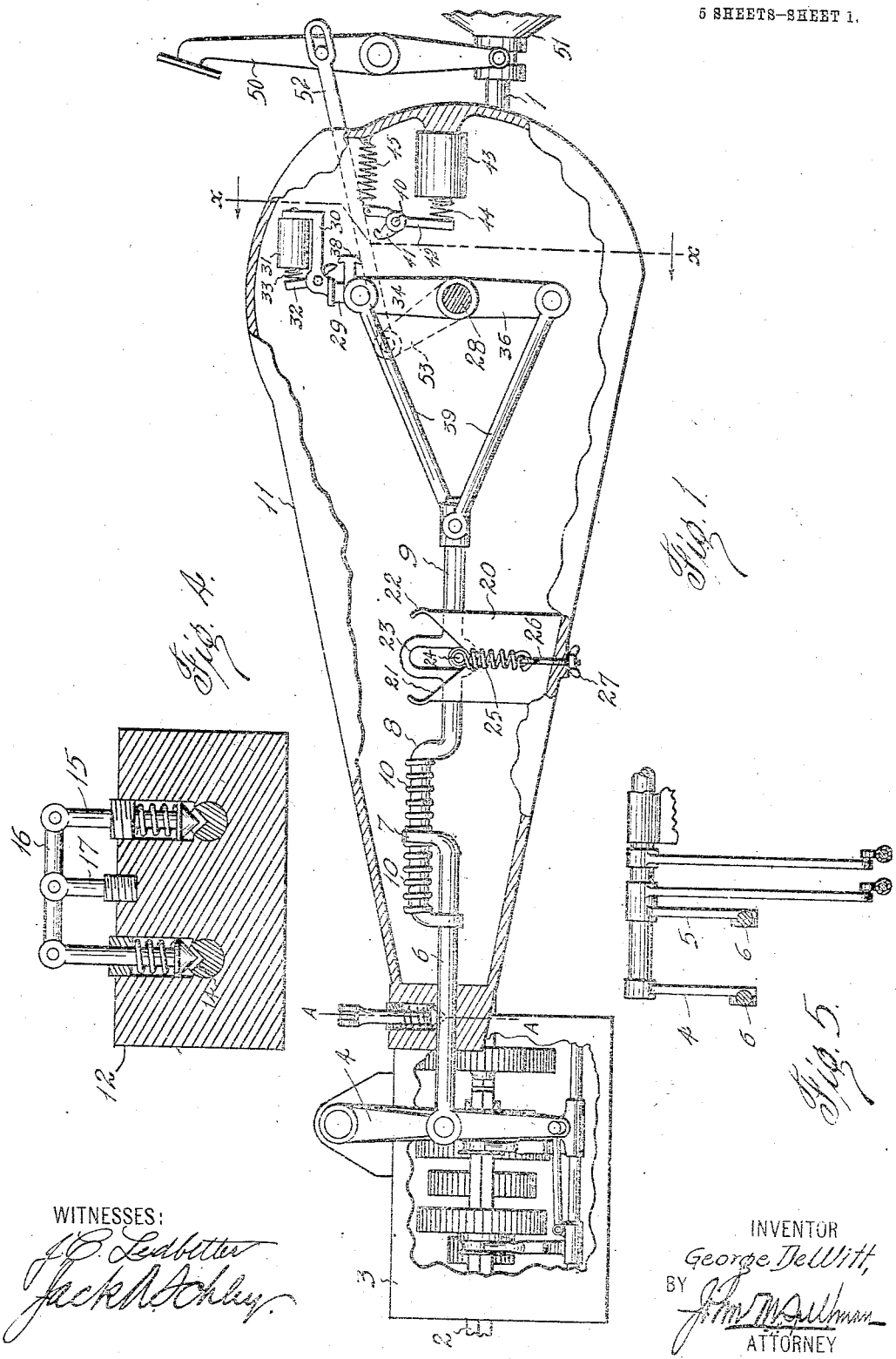
Figure 2:
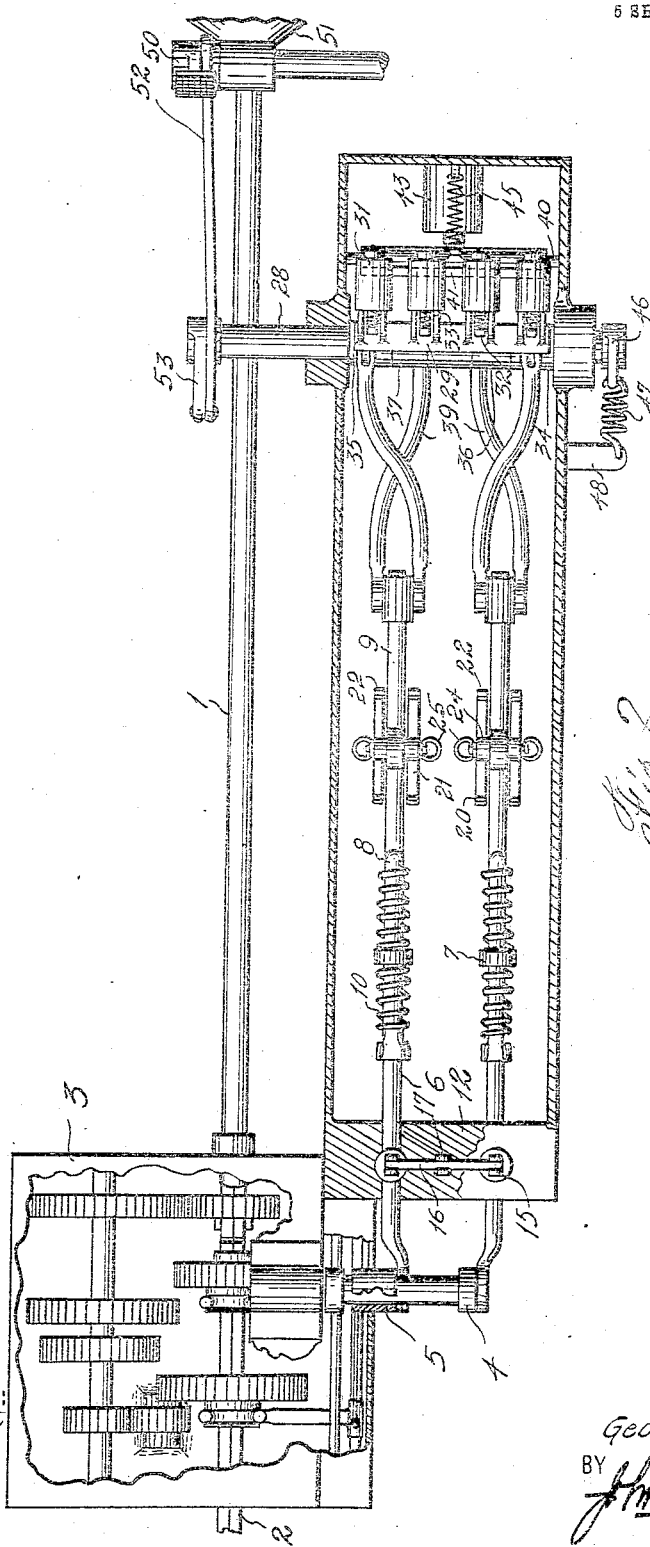
Figures 6, 7:
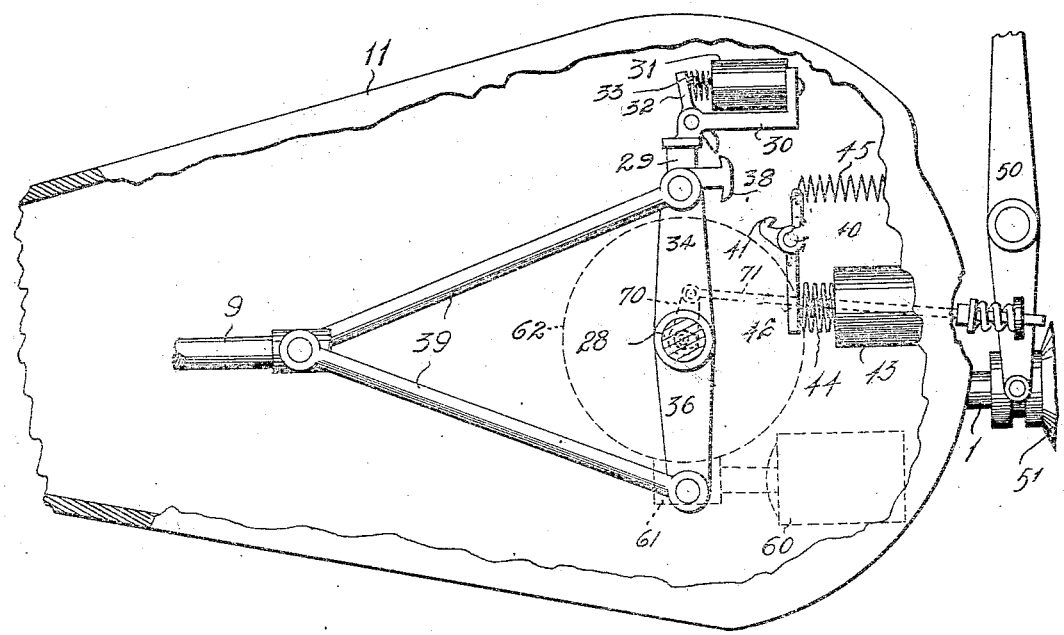
Figure 12:
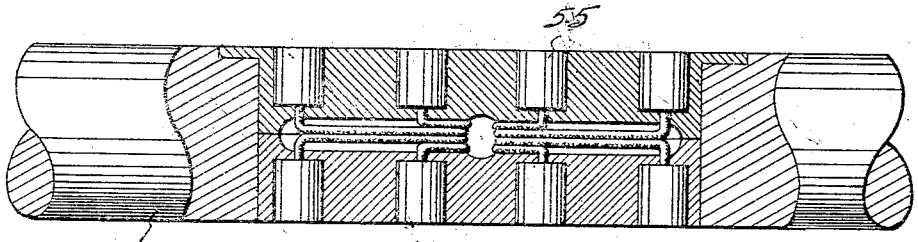
Figure 11:
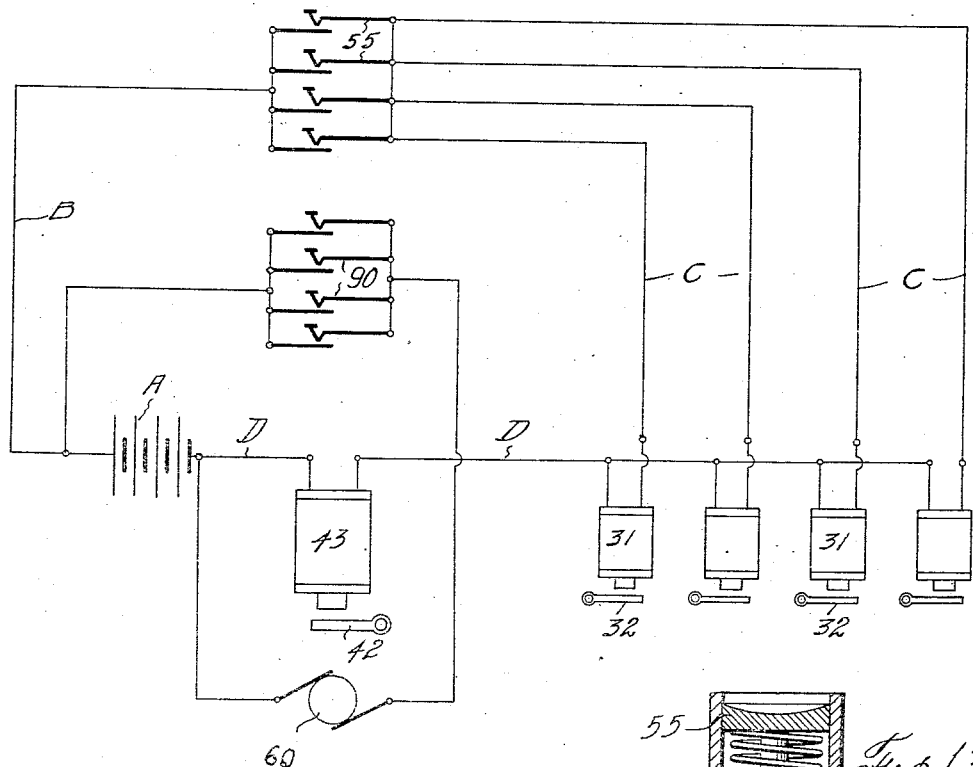
Figure 13:
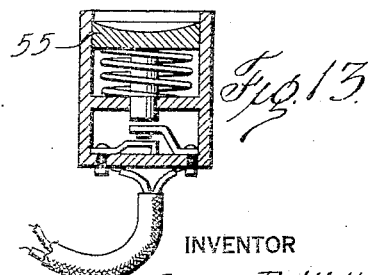

With the above and other objects in view the invention has relation to certain novel features of construction and operation, an example of which is described in the following specification and illustrated in the accompanying drawings, wherein:

Figure 1 is a longitudinal sectional view of the operating mechanism, Fig. 2 is a plan view of the same, Fig. 3 is a transverse vertical sectional view on the line X—X of Fig. 1, Fig. 4 is a transverse vertical sectional view on the line A—A of Fig. 1, Fig. 5 is a detail of the transmission links, Fig. 6 is a side elevation of a slightly modified form, the casing being shown broken away, Fig. 7 is a plan view of the same, Fig. 8 is a detail sectional view of the motor drive mechanism, Fig. 9 is a sectional view taken on the line S—S of Fig. 8, Fig. 10 is a detailed section on the line Y—Y of Fig. 8, Fig. 11 is a diagrammatical view of the circuits employed, Fig. 12 is a detail in section of the switch buttons and their mounting, and Fig. 13 is a sectional detail of one of the switch buttons.

In the drawings the numeral 1 designates the clutch shaft of an ordinary transmission mechanism, and 2 the drive shaft. The usual gears and parts are arranged in the transmission casing 3. The transmission shifting arms 4 and 5 have connection with shifting rods 6. In the type of transmission mechanism illustrated there is provision for shifting the gears to give three speeds ahead and one to the rear. This is accomplished by swinging the arms 4 and 5, each arm effecting one shift when swung forward and another shift when swung rearward.

The rods 6 terminate in upturned lugs 7 slidably receiving the yoke-shaped portions 8 of operating rods 9. The extremities of these portions are turned down and slidably embrace the rods 6 as is shown in Fig. 1. On each side of each lug 7 a coiled spring 10 is confined on the portion 8. These springs bear on opposite sides of said lug and exert sufficient pressure to normally retain the lug in a central position. If the transmission gears hang and offer resistance to the reciprocation of the rods 9, the springs will be compressed and will yield until the obstruction is removed, after which the parts will work under normal conditions.

It is obvious that only one rod 6 should be moved at a time and to lock the other rod against operation, a rocking locking device is provided. The rods 6 are disposed in an elongated casing 11 contracted toward its rear end which is in proximity to the transmission casing 3. At the rear extremity of the casing 11 a housing 12 is provided and the rods 6 pass through this housing as shown in Figs. 1, 2 and 4. Each rod has a conical depression 14 in that part passing through the housing. A pair of spring pressed plungers 15 are mounted vertically in the housing over the rods and each plunger has its lower end pointed and adapted to ride into and out of the depressions. The upper ends of the plungers are pivoted to the extremities of a rocking lever 16 centrally pivoted on a post 17 mounted on the housing 12. Normally with the parts at neutral the plungers each have their pointed ends projecting about half way into the depressions 14. If either rod is reciprocated, the plunger thereof rides out of its depression onto the surface of the rod, whereby the other plunger is forced to the bottom of its depression and its rod cannot be reciprocated until the first rod is returned to neutral.

It is desirable to have the parts of the transmission mechanism normally in neutral relation and also to have the parts return from a selected position to neutral, before shifting to another selected position. To accomplish this I provide what I term "neutralizers." Each neutralizer comprises a pair of standards 20 receiving the operating rods 9 therebetween. Each standard has a V-shaped guide 21 in its top terminating at each side in horns 22, as shown in Figs. 1 and 2.

Each rod 9 has a vertical loop 23 in which a roller 24 is mounted. This roller projects onto the surfaces of the guides 21 and has projecting ends or trunnions about which the upper ends of coiled springs 25 are confined. The lower ends of the springs are attached to eye bolts 26 projecting through the bottom of the casing 11 and receiving exterior thumbnuts 27. By screwing up the nuts 27 the springs are placed under tension whereby the rollers are drawn to the bottoms of the guides 21. If a rod 9 is moved, its roller 24 rides up the inclined faces at one side of the guides 21, the horns 22 acting as stops to retain the roller in the guide at the end of its upward movement. It is obvious that as soon as a rod 9 is released the springs will return the roller and rod to normal or neutral position whereby the transmission parts are returned to neutral.

One of the novel features of this invention is mechanism for reciprocating the rods 9 forward and rearward whereby the transmission gears are shifted and any of the positions or "speeds," selected. Another novel feature is to effect this operation by electrical means set into operation by merely pressing a button and operating the clutch pedal. The forward portion of the casing 11 is enlarged and a shaft 28 is journaled transversely therein. This shaft projects on each side of the casing as is shown in Figs. 2 and 3.

A T-shaped actuating member 29 is fixed centrally to the shaft 28 within the casing 11. Four spaced brackets 30 are fixed on the upper horizontal portion of the actuating member. Two such brackets are used in connection with each operating rod 9 and the number of brackets may be increased or diminished according to the number of rods employed. Each bracket has fixed therein, an electro-magnet 31. Each magnet has an armature lever 32 pivoted in its bracket and projecting below the horizontal portion of the actuating member. Each magnet carries a coiled spring 33 bearing against the upper end of the correlated armature lever 32 whereby the latter is normally held away from the core of the magnet. A plurality of arms are loosely confined on the shaft 28. Two of said arms 34 and 35 respectively are mounted at their low ends and extend upward from the shaft; while the other two arms 36 and 37 respectively, are centrally pivoted on said shaft and extend above and below the latter. The upper ends of the arms terminate in substantially the same horizontal plane and each carries a rigid forwardly projecting double hook 38. A pair of links 39 are pivoted to the forward end of each operating rod 9. These links are directed upward and downward, the upwardly directed links being pivoted to the arms 34 and 35 and the downwardly directed links being pivoted to arms 36 and 37 at their lower ends. The links are bent to make these connections and it is apparent that each rod 9 has connection with diverging links above and below its longitudinal center. By swinging one of the arms connected to a rod the latter will be moved forward and upon swinging the other arm of said rod the latter will be moved rearward. It is obvious that when one of the rods 9 is moved the link 4 or 5 connected thereto, will be swung and when said link is swung rearward one gear selection will be made; while another gear selection will be effected when the same link is swung forward, the roller 24 returning the parts to neutral between each selection. The arms being loosely confined on the shaft 28, are free to be swung and thus if the arm 35 is swung forward the lower end of the arm 37 will likewise be carried forward and the rod 9 moved forward. Should the upper end of the arm 37 be moved forward its lower end and the link 39 connected thereto, will be swung rearward; the other link swinging the arm 35 rearward, and the rod 9 thus being moved rearward.

The hooks 38 are normally under the armature levers 32 so that should the circuit through a magnet be closed its armature lever will be attracted and swung whereby its lower end is moved downward. Under this condition the upper side of the correlated hook will be in the path of said lever and when the actuating member 29 is swung forward the lever will engage the hook and swing the correlated arm forward. A small shaft 40 is mounted transversely of the casing near the forward end and a latch 41 is hinged on this shaft. This latch has such a width as to be engaged by the underside of any of the hooks 38 when the latter is swung forward. The latch has a depending armature 42 normally displaced from an electro-magnet 43 by a coiled spring 44 as shown in Fig. 1. A coiled spring 45 is connected to lug on the latch and is secured to the casing wall. The spring 45 serves to prevent the hook from engaging over the latch and to hold the latter in engagement with the hook.

When one of the arms is swung forward its hook 38 is engaged with the latch and the transmission gears shifted as hereinbefore described. The parts are held in this selected position until the hook is released which is accomplished by closing the circuit through the magnet 43 whereby the armature 42 is attracted and the latch swung down. Upon releasing the hook the neutralizer will return the arms to normal position through the agency of the links 39. For returning the actuating member to normal position after one of the hooks has been disengaged from the latch a crank-arm 46 is fixed on the projecting end of the shaft 28 and connected to one end of a coiled spring 47 which has its other end attached to a bracket 48 projecting from the side of the casing as shown in Fig. 2.

Before shifting the transmission gears it is necessary to disconnect the clutch shaft 1 from the engine in order to prevent "stripping" the gear teeth. In the several figures of the drawings the numeral 50 designates the usual clutch pedal which is connected to the clutch 51 and operates in the usual way. Above its pivot point the clutch pedal has a limited sliding connection with the forward end of a pitman 52 which is pivoted at its rear end to the outer end of an arm 53 fixed in the projecting end of the shaft 28. When it is desired to shift the transmission gears the pedal is pushed forward whereby the actuating member 29 is swung, the sliding connection between the pitman 52 and the pedal permitting said pedal to disengage the clutch prior to the swinging of the actuating member.

In Fig. 11 I have shown a circuit diagram the several parts being indicated by the numerals heretofore applied to them. To close the circuits and energize the magnets I employ a plurality of push buttons 55 which may be mounted at any convenient place and in Fig. 12 I have shown them mounted in the rim 56 of a steering wheel. One of the contacts of each button 55 has connection with one side of a battery A or other source of electro-motive force, by means of a wire B. A button is provided for each magnet 31 and connected therewith by a wire C. The release magnet 43 is connected in multiple with the magnets 31 so that it is energized when any of said magnets are energized. This connection is made by a wire D in which the magnet 43 is connected in series, said wire D being connected to the battery A opposite to the wire B.

Having described the various parts, I will now give a brief description of the operation. The parts being at neutral, if it is desired to shift the transmission gears to obtain a certain speed ratio, the driver presses the button 55 which bears the designation of the speed desired. This closes the circuit through the correlated magnet 31. As an example we will suppose that a button is pushed to close the circuit through the magnet at the left hand of Fig. 3, which magnet is shown also in Fig. 1 and at the bottom of Fig. 2. The magnet being energized attracts its armature lever 32 whereby the lower end of the latter is swung downward. The driver now pushes the foot pedal 50 forward which disengages the clutch 51 and after taking up the lost motion of the pitman 52, due to slotted connection, swings the shaft 28 forward. The hook 38 of the arm 34 being in the path of the said armature lever will be engaged by the latter, as the shaft swings the actuating member 29 forward. The arm 34 being swung forward pulls the rod 9 forward by means of the correlated link 39, the rod pushing its other link 39 forward which swings the arm 36 idly. The rod 9 being displaced forward carries with it the rod 6 which swings the arm 4 of the transmission mechanism, the latter shifting the transmission gears into the position desired. As the rods are displaced the roller 24 associated therewith rides up the inclined faces of the guide 21. The arm 34 is carried forward until its hook is over the latch 41. When the circuit through the magnet 31 was closed the circuit through the release magnet 43 was also closed and if any of the hooks 38 were in engagement with the latch 41 it would be released and the neutralizer would return the arm of said hook and other parts, to neutral before the selected arm 34, 35, 36 or 37 was moved forward. The driver holds the circuit closed until the shift of gears has been completed which requires but a fraction of a minute. After releasing the push button the pedal 50 is held forward in order that the magnet 43 may release the latch 41 and permit its spring 45 to draw said latch into engagement with the under side of the hook 38, after which the pedal may be released. When the pedal is released the clutch is engaged and the spring 47 returns the shaft 28, actuating member 29 and pitman 52 to their normal position. The hook 38 of the arm 34 being held by the latch 41 causes the selected position of the transmission gear to be maintained until another button is depressed. Any button being depressed closes the circuit through the release magnet 43 which releases the latch 41 and any hook and its correlated arm which is being held by said latch. When the hook and arm are released the springs 25 being under tension, pull the roller 24 down inclined faces of the guide whereby the rods 6 and 9 are returned to normal or neutral position, the parts connected to said rods then being returned to neutral position. It will be seen that if one of the arms 34, 35, 36 or 37 has been swung forward and the transmission gears shifted, before said gears can be shifted into another position and one of the other arms swung, the first arm is returned and the parts automatically returned to neutral. This arrangement prevents damage to the gears and establishes an automatic neutral point between each shift thus relieving the driver of the responsibility. The locking plungers 14 lock the rod 6 which has not been operated and thus only one rod can be shifted at a time.

In Figs. 6 to 10 inclusive I have illustrated a motor connection for swinging the shaft 28 and when this attachment is used the pitman 52 and arm 53 connecting with the clutch pedal 50, are omitted. As shown in Fig. 7 a suitable motor 60 is secured to the side of the casing 11 and has driving connection with a screw 61 located under the shaft 28. A gear casing 62 surrounds the shaft 28 and incloses a worm gear ring 63 which meshes with the screw 61 as is shown in Fig. 8. The gear has annular internal shoulders 64 at each side of its inner periphery. Bearing plates 65 secured to the walls of the casing 62, engage in these shoulders and support the gear ring 63 which is free to revolve. A sector is cut out of each plate and the solid portions of said plates are connected by web 66. A housing 67 is keyed on the shaft 28 within the cut out portion of the plates and extends radially as shown in Fig. 8. As shown in Fig. 9 the shaft 28 has a recess 68 from which a shaft 69 extends longitudinally through the shaft 28 and is arranged to turn freely therein. A crank arm 70 is fixed on the projecting end of the shaft 69 and is pivoted to an actuating rod 71 which extends to within easy reach of the driver. A rocker arm 72 is fixed on the end of the shaft 69 within the recess 68 and bears against the bottom of a clutch plunger 73 working within the housing 67 and normally held depressed by a coiled spring 74 seated in the side of the plunger having its upper end engaging under a screw 75 projecting inward from the housing as shown in Fig. 8. The outer or upper end of the clutch plunger 73 has a clutch jaw 76. A lug 77 projecting from the inner surface of the gear ring 63 has an inclined face. By closing the motor circuit the gear is caused to revolve. The driver desiring to select a transmission speed pushes the proper button 55 and closes the circuit through the motor, by means hereinafter described, and also pushes the clutch out of engagement. The proper armature lever 32 having been lowered the parts are now ready for the swinging of the shaft 28. The driver now operates the rod 71 whereby the shaft 69 is rocked and the plunger 73 forced outward so that its jaw 76 is in the path of the lug 77. The lug coming into contact with the jaw swings the plunger and its housing 67 to the left, reference being had to Fig. 8. Fig. 8 being a view looking from the upper side of Fig. 7 it will be seen that the housing and plunger are swung forward, thus swinging the actuating member 29 and its correlated parts forward and effecting the shift of gears as hereinbefore described. When the housing 67 contacts with the web 66 a stop 78 carried by said web enters the housing through a slot 79. The outer face of the stop is inclined inwardly and downwardly and engages a recess 80 in its plunger with the result that the bottom edge of said recess riding down the face stop causes the plunger to be drawn inward, whereby the jaw 76 is withdrawn from the lug 77 and the gear 63 permitted to continue its revolution without injury to the parts. The button 55 is released thus breaking the circuit through the magnet 31 and permitting the actuating member, housing 67 and plunger to be returned to normal position by the spring 47. After the circuit through the magnet 31 is broken the foot pedal is released.

In Fig. 11 the motor circuit is indicated. From the battery A connection is had with the motor 60 by a wire E and from the other contact of the motor a wire F leads to a set of buttons 90, from the other contacts of which a wire G leads to the battery A. By pressing any one of the buttons 90 the motor circuit is closed. The buttons 90 are located directly under the buttons 55 in the steering wheel 56 as shown in Fig. 12. From this it is apparent that the upper buttons 55 may be pressed by the thumb and one of the under buttons 90, pressed by one of the driver's fingers.

What I claim, is:

1. In an electric gear shifter, a plurality of operating members arranged for connection to the shifting elements of a transmission mechanism, a neutralizer directly connected to the operating members, an actuating member, and means for electrically establishing selected connection between the actuating member and any of the operating members.

2. In an electric gear shifter, a plurality of operating members arranged for connection to the shifting elements of a transmission mechanism, a neutralizer directly connected to the operating members, an actuating member, means for electrically establishing selected connection between the actuating member and any of the operating members, and means for operating the actuating member.

3. In an electric gear shifter, a plurality of operating members arranged for connection to the shifting elements of a transmission mechanism, a neutralizer directly connected to the operating members, an actuating member, means for electrically establishing selected connection between the actuating member and any of the operating members, means for operating the actuating member and means for returning the actuating member to normal position.

4. In an electric gear shifter, a plurality of operating members arranged for connection to the shifting elements of a transmission mechanism, a neutralizer directly connected to the operating members, an actuating member, means for electrically establishing selected connection between the actuating member and any of the operating members, and means for holding the selected operating member in its operated position.

5. In an electric gear shifter, a plurality of operating members arranged for connection to the shifting elements of a transmission mechanism, a neutralizer directly connected to the operating members, an actuating member, means for electrically establishing selected connection between the actuating member and any of the operating members, means for holding the selected operating member in its operated position and means for releasing the selected operating member from its operated position.

6. In an electric gear shifter, a plurality of operating members arranged for connection to the shifting elements of a transmission mechanism, a neutralizer directly connected to the operating members, an actuating member, means for electrically establishing selected connection between the actuating member and any of the operating members, means for operating the actuating member, means for returning the actuating member to normal position and means for holding the selected operating member in its operated position.

7. In an electric gear shifter, a plurality of operating members arranged for connection to the shifting elements of a transmission mechanism, a neutralizer directly connected to the operating members, an actuating member, means for electrically establishing selected connection between the actuating member and any of the operating members, means for operating the actuating member, means for returning the actuating member to normal position, means for holding the selected operating member in its operated position and means for releasing the selected operating member from its operated position.

8. In an electric gear shifter, a plurality of operating members arranged for connection to the shifting elements of a transmission mechanism, a plurality of pivoted shifting members connected to the operating members, an actuating member associated with the shifting members, and electrically operated means for selectively establishing operative connection between the shifting members and the actuating member.

9. In an electric gear shifter, a plurality of operating members arranged for connection to the shifting elements of a transmission mechanism, a plurality of pivoted shifting members connected to the operating members, an actuating member associated with the shifting members, electrically operated means for selectively establishing operative connection between the shifting members and the actuating members and means for swinging the actuating member.

10. In an electric gear shifter, a plurality of operating members arranged for connection to the shifting elements of a transmission mechanism, a plurality of pivoted shifting members connected to the operating members, an actuating member associated with the shifting members, electrically operated means for selectively establishing operative connection between the shifting members and the actuating members, means for swinging the actuating member, and means for holding the shifting members in their operated position.

11. In an electric gear shifter, a plurality of operating members arranged for connection to the shifting elements of a transmission mechanism, a plurality of pivoted shifting members connected to the operating members, an actuating member associated with the shifting members, electrically operated means for selectively establishing operative connection between the shifting members and the actuating members, means for swinging the actuating member, means for holding the shifting members in their operated position, and means for returning the actuating member to its normal position.

12. In an electric gear shifter, a plurality of operating members arranged for connection to the shifting elements of a transmission mechanism, a plurality of pivoted shifting members connected to the operating members, an actuating member associated with the shifting members, electrically operated means for selectively establishing operative connection between the shifting members and the actuating members, means for swinging the actuating member, means for holding the shifting members in their operated position, means for returning the actuating member to its normal position, and means for releasing the selected shifting member from its held position.

13. In an electric gear shifter, a plurality of operating members arranged for connection to the shifting elements of a transmission mechanism, a plurality of pivoted shifting members connected to the operating members, an actuating member associated with the shifting members, electrically operated means for selectively establishing operative connection between the shifting members and the actuating members, means for swinging the actuating member, means for holding the shifting members in their operated position, means for returning the actuating member to its normal position, means for releasing the selected shifting member from its held position, and means for returning the operating members to neutral.

14. In an electric gear shifter, a plurality of operating members arranged for connection to the shifting elements of a transmission mechanism, a plurality of pivoted shifting members connected to the operating members, an actuating member associated with the shifting members, electrically operated means for selectively establishing operative connection between the shifting members and the actuating members, means for swinging the actuating member, and means for locking the operating member against operation.

15. In an electric gear shifter, a plurality of operating members arranged for connection to the shifting elements of a transmission mechanism, means for automatically returning the operating members to neutral after each operation, an actuating member, means for electrically establishing selected connection between the operating members and the actuating members, and means for operating the actuating member.

16. In an electric gear shifter, a plurality of operating members arranged for connection to the shifting elements of a transmission mechanism, means for automatically returning the operating members to neutral after each operation, an actuating member, means for electrically establishing selected connection between the operating members and the actuating members, means for operating the actuating member and means for holding the selected operating member in its operated position.

17. In an electric gear shifter, a plurality of operating members arranged for connection to the shifting elements of a transmission mechanism, means for automatically returning the operating members to neutral after each operation, an actuating member, means for electrically establishing selected connection between the operating members and the actuating members, means for operating the actuating member, means for holding the selected operating member in its operated position, and electrically controlled means for releasing the selected operating member arranged to operate simultaneously with the means for electrically establishing connection between the actuating member and the operating members.

18. In an electric gear shifter, a plurality of operating members, a neutralizer connected to each operating member, a plurality of pivoted arms having pivotal connection with the operating members, an actuating member adjacent the arms, and electrically controlled means for establishing connection between the actuating member and a predetermined arm.

19. In an electric gear shifter, a plurality of operating members, a neutralizer connected to each operating member, a plurality of pivoted arms having pivotal connection with the operating members, an actuating member adjacent the arms, electrically controlled means for establishing connection between the actuating member and a predetermined arm, and means for swinging the actuating member.

20. In an electric gear shifter, a plurality of operating members, a neutralizer connected to each operating member, a plurality of pivoted arms having pivotal connection with the operating members, an actuating member adjacent the arms, electrically controlled means for establishing connection between the actuating member and a predetermined arm, means for swinging the actuating member and means for returning the actuating member to normal position independently of the selected arm.

21. In an electric gear shifter, a plurality of operating members, a neutralizer connected to each operating member, a plurality of pivoted arms having pivotal connections with the operating members, an actuating member adjacent the arms, electrically controlled means for establishing connection between the actuating member and a predetermined arm, means for swinging the actuating member and means for locking the unoperated operating member against operation.

22. In an electric gear shifter, a shaft, an actuating member fixed on the shaft, a magnet mounted in fixed relation to the actuating member, a shifting member pivoted on the shaft, and an armature-latch pivoted adjacent to the magnet on the actuating member and adapted to depend into the path of the shifting member.

23. In an electric gear shifter, a rock shaft, an actuating member fixed on the shaft, a plurality of magnets mounted on the actuating member, a plurality of shifting members pivoted on the shaft, a shifting member being associated with each magnet, and an armature-latch pivoted on the actuating member adjacent to each magnet, a latch being provided for each shifting member and adapted to be swung into the path thereof when its respective magnet is energized.

24. In an electric gear shifter, the combination with a clutch pedal and the shifting elements of transmission gearing, of means for selectively shifting the gears comprising a pivoted shaft adapted to be rocked by the clutch pedal, means mounted on the shaft and having connection with the shifting elements for operating the same, and means for electrically establishing selected connection between the clutch pedal and the shifting element operating means.

25. In an electric gear shifter, a rock shaft, an actuating arm fixed on the shaft, a plurality of magnets carried by the arm, a plurality of shifting members pivoted on the shaft and one correlated with each magnet, armature latches pivoted on the arm, a latch being provided for each magnet, each latch having a portion adapted to engage one of the shifting members, and a plurality of springs, one connected to each latch and normally holding the latch out of the path of its respective shifting member.

26. In an electric gear shifter, the combination of a transmission gear shifting element arranged to reciprocate, a plurality of arms pivoted and connected with the shifting element for operating the same, a pedal, and electrically operated means comprising a plurality of magnetic catches for establishing connection between the pedal and selected arms.

In testimony whereof I have signed my name to this specification in the presence of two subscribing witnesses.

GEORGE DE WITT.

Witnesses:
L. J. FORTASSAIN,
A. H. MANSFIELD.